G. W. MARBLE.
POWER TRANSMISSION DEVICE.
APPLICATION FILED JAN. 29, 1910.
1,038,918.
Patented Sept. 17, 1912.
5 SHEETS—SHEET 2.
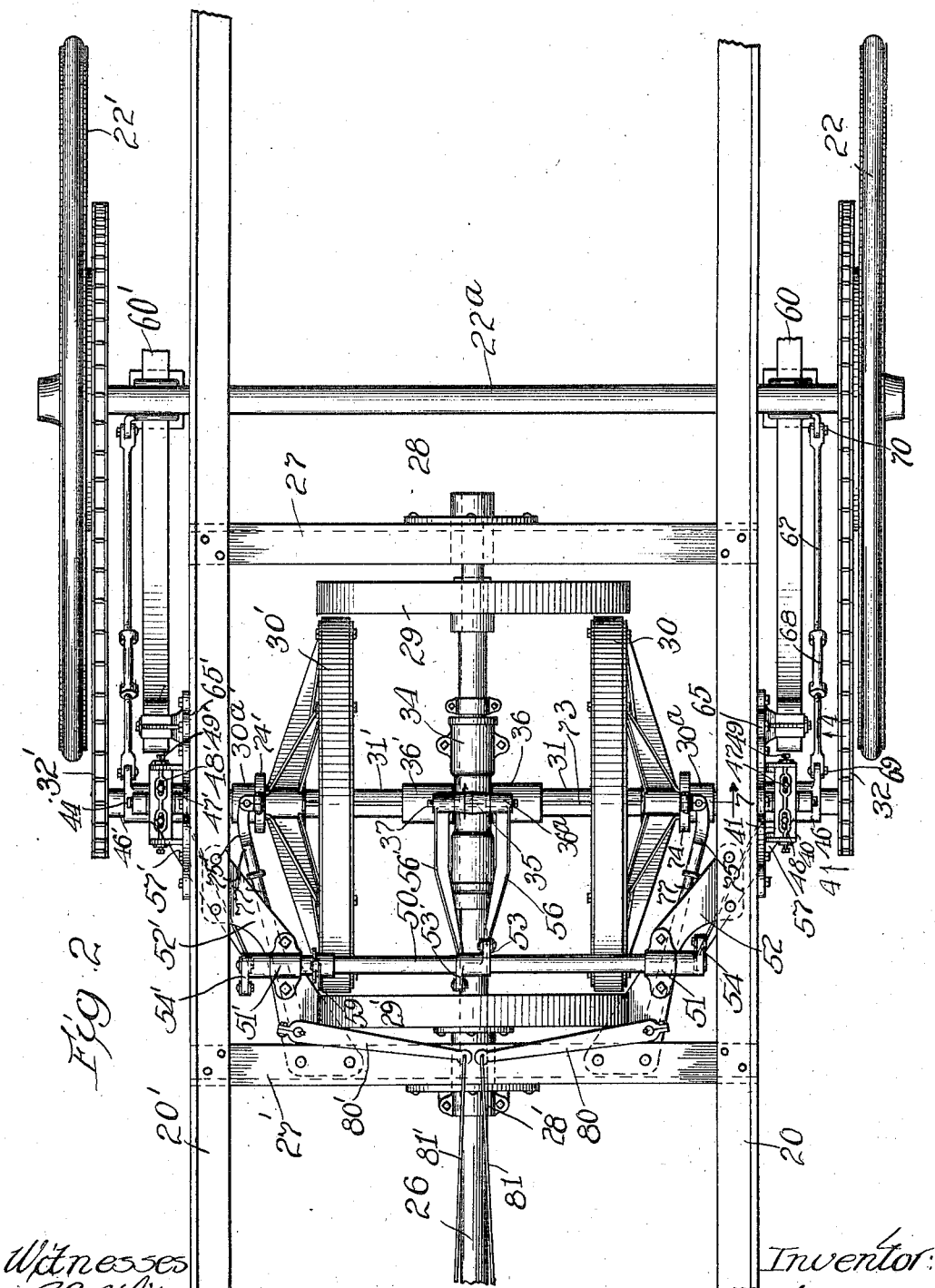

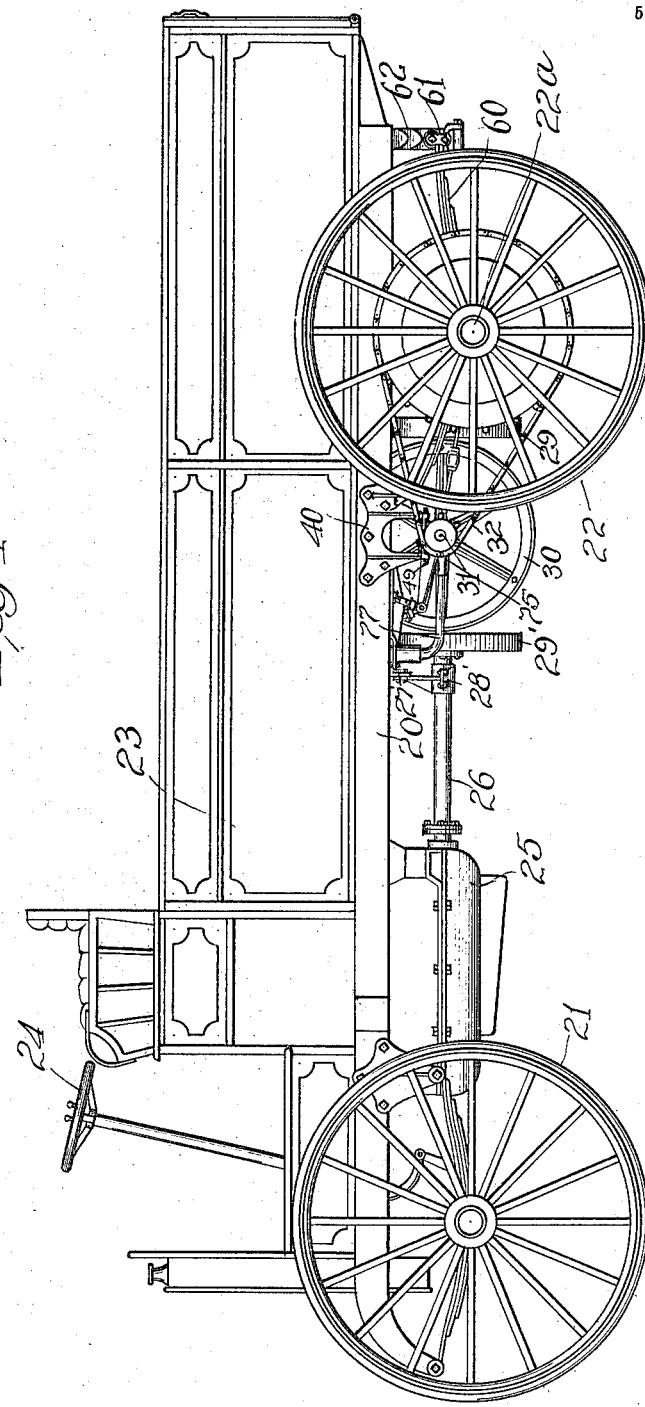

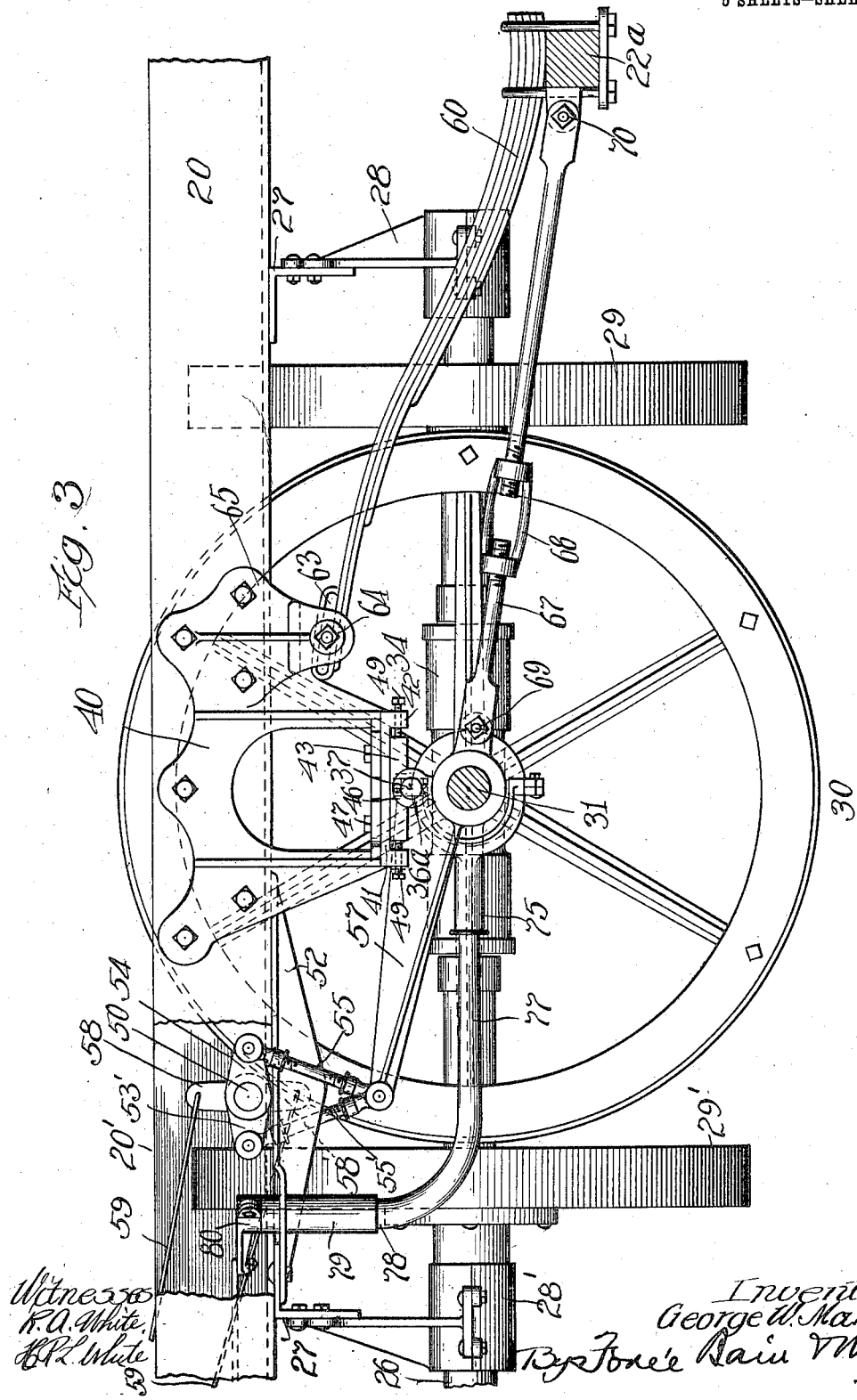

G. W. MARBLE.
POWER TRANSMISSION DEVICE.
APPLICATION FILED JAN. 29, 1910.
1,038,918.
Patented Sept. 17, 1912.
5 SHEETS—SHEET 4.
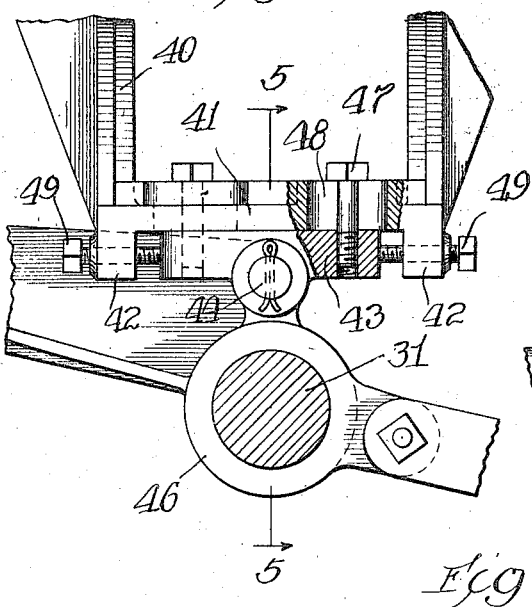
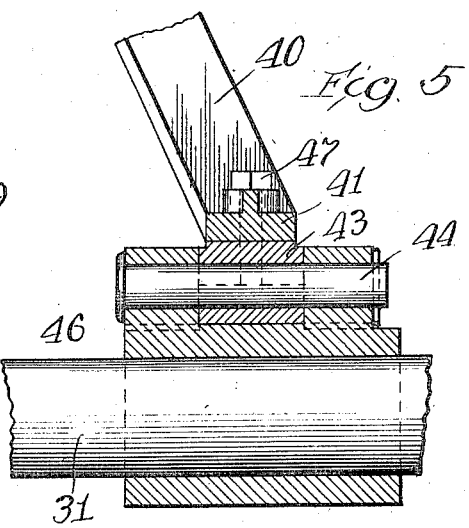
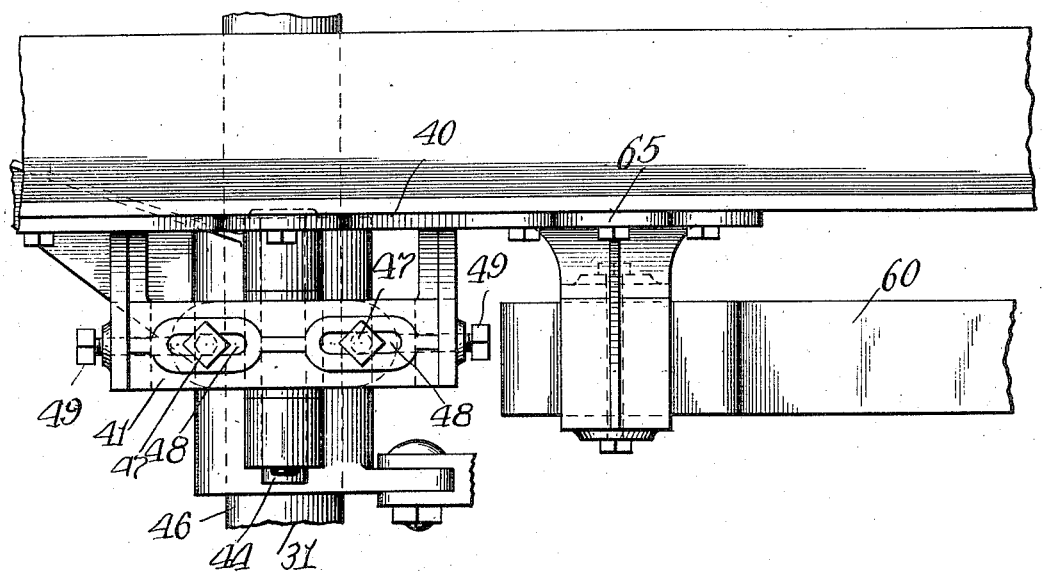
Witnesses:
R. A. White
C. B. White
Inventor:
George W. Marble,
By Foree Bain May Atty's

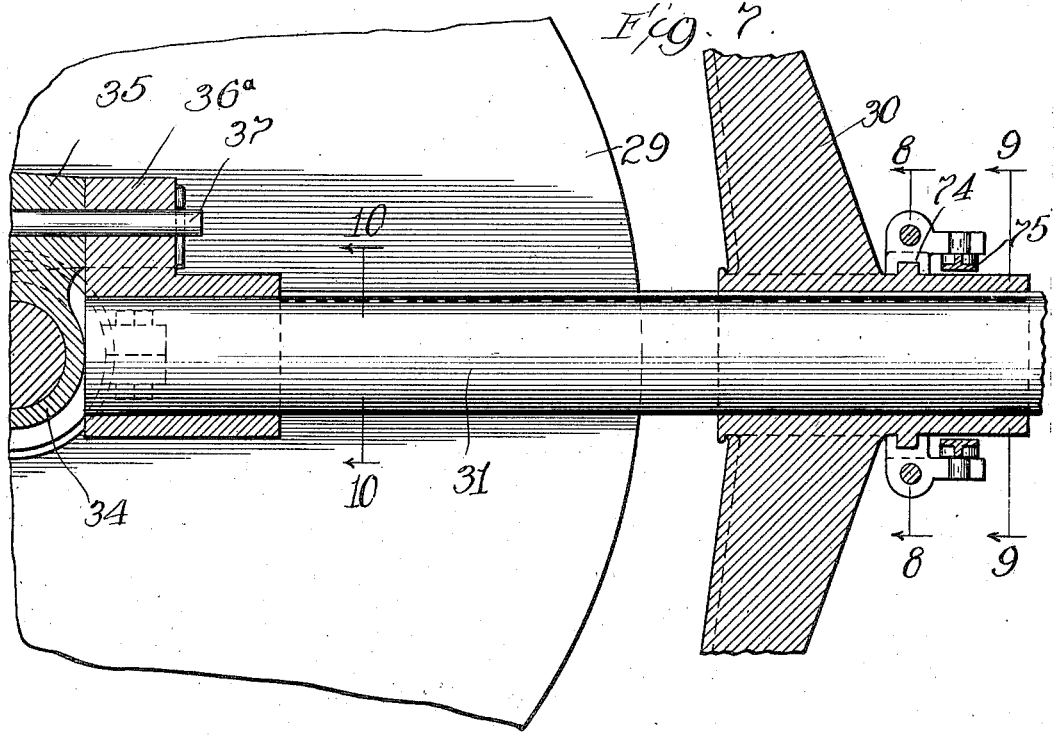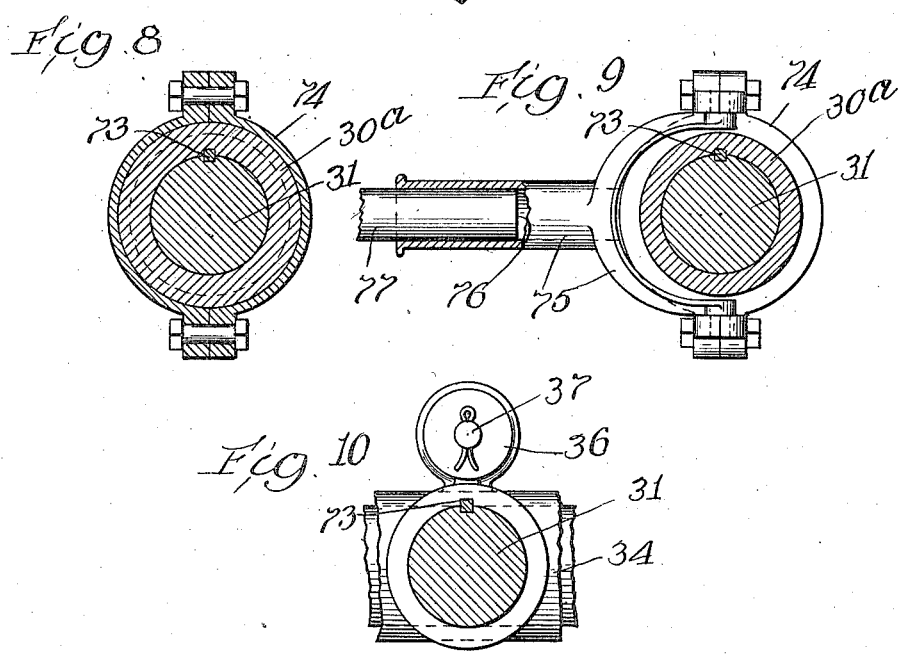

UNITED STATES PATENT OFFICE.

GEORGE W. MARBLE, OF CHICAGO, ILLINOIS, ASSIGNOR TO STEPHENSON MOTOR TRUCK COMPANY, OF MILWAUKEE, WISCONSIN, A CORPORATION.

POWER-TRANSMISSION DEVICE.

1,038,918.

Specification of Letters Patent.   Patented Sept. 17, 1912.

Application filed January 29, 1910.  Serial No. 540,796.

*To all whom it may concern:*

Be it known that I, GEORGE W. MARBLE, a citizen of the United States, residing at Chicago, in the county of Cook and State of Illinois, have invented certain new and useful Improvements in Power-Transmission Devices, of which the following is a specification.

My invention relates to improvements in power transmitting devices, and more particularly to variable-speed frictional power-transmission equipment for motor vehicles and the like.

One of the objects of my invention is to provide means for accomplishing the various movements between parts of such transmission mechanism effectually and economically; and preferably without material disturbance of the relation of the movable transmission parts moved to the traction wheels wherewith they are connected.

In the drawings, wherein I have shown an embodiment of my invention, Figure 1 is a side elevation of a "commercial" motor vehicle equipped with my improved gearing; Fig. 2 is a plan view of a part of the chassis, with the gearing in place; Fig. 3 is a side elevation with parts broken away, showing in enlarged form parts of the gearing; Fig. 4 is an end view of the structure shown in Fig. 6, with parts broken away. Fig. 5 is a section on line 5—5 of Fig. 4; Fig. 6 is a plan view, enlarged, of parts shown in Figs. 2 and 4; Fig. 7 is a section on line 7—7 of Fig. 2; and Figs. 8, 9, and 10, are detail sections on lines 8—8, 9—9, and 10—10 of Fig. 7.

Referring to Fig. 1, 20—20' indicate the side sills of an automobile frame mounted upon guiding wheels, 21, and traction wheels, 22, and carrying a body, 23, operating mechanism, 24, and an engine, 25, communicating power to a power shaft, 26. It will be understood that the embodiment shown is intended for purposes of illustration and full disclosure only and that the specific character of the automobile as to general design may be widely varied and forms, *per se*, no part of the present invention.

The frame preferably provides two cross members, 27 and 27', forming the fore and aft boundaries of the gear space within which are located the friction wheels and disks. The main shaft 26 extends longitudinally and centrally through this space and receives support from suitable bearing brackets, 28 and 28', suspended from the cross members 27 and 27' respectively. The main shaft bears confronting friction wheels or disks, 29 and 29', rotatable in unison and in the same direction, and with which coöperate, at what I may term diagonally opposite points, friction wheels, 30 and 30'. By diagonally opposite cooperation of the wheels and disks, I mean that when a disk 29 and wheel 30 are contacting, disk 29' and wheel 30' likewise contact, or vice versa, so that rotation in the same direction may be imparted to both wheels, 30 and 30'. The wheels 30 and 30' are respectively mounted upon transverse shaft elements 31 and 31', each extending from a point of support near the center of the gearing space to a point preferably transversely beyond the frame, and each said shaft having a positive drive connection with its traction wheel, 22 and 22', as through the sprocket-and-chain drive, 32 and 32'. It is one of the desiderata of my invention to provide an equipment whereby if desirable the positive gearing relation between the respective driven shafts, 31 and 31', and their traction wheels, 22 and 22', may remain unchanged regardless of any shifting of the shafts, 31 and 31', and the construction whereby I attain this end will presently be described.

Each shaft, 31 and 31', is mounted for fore-and-aft movement in constant parallelism, that is to say, while maintained constantly at right angles to the main shaft 26, and to this end I loosely mount upon the main shaft 26 a housing or sleeve, 34, provided with an upwardly extending bearing lug, 35, to which are pivotally connected on opposite sides ears, 36ª, of pendent bearing members, 36 and 36', pivoting on a transverse pin, 37, and each affording bearing to its appropriate shaft member 31, or 31', in the plane of the main shaft 26. It will be observed that these inboard bearings of the shafts, 31 and 31', are substantial duplicates, and it will be understood that the outer bearings for said shafts are likewise duplicates in general construction, so that I will describe only one thereof.

To the side member 20 of the frame is connected a suitable bracket, 40, having its horizontal foot plate, 41, longitudinally flanked by depending lugs, 42, and receiving flat against its under side a plate, 43, affording support to a pivot pin, 44, to which are pivoted the ears of a bearing member, 46, for the shaft 31, the pins, 44, alining with pivot 37 and the distance from the shaft center to the pivotal center for the bearing 46 being the same as that for the bearing member 36.

For nice adjustment of the pivot pins, 44, longitudinally, the plate 43 is secured to the foot, 41, by screws, 47, for play in longitudinally elongated slots, 48, and adjusting set screws, 49, are provided in the lugs, 42, accurately to position the plates, 43, before the screws, 47, are tightened. For moving the shafts 31 and 31' fore and aft, with reference to the vehicle, and in opposite directions (one forward and the other aft), I provide a transverse shaft rod, 50, mounted in bearings, 51 and 51', extending upward from horizontal frame braces, 52 and 52', which cross the forward corners of the gear space, said shaft having connected to it on one side of its center two rearwardly extending arms, 53 and 54, and on the opposite side of its center two similar arms, 53' and 54', extending forwardly. These four arms are all connected by pivoted links, 55, to the pivot points of arms 56, 57, and 57' and 56', respectively, which are all of equal length, the arms, 56 and 56', projecting from the bearing members, 36 and 36', and the arms 57 and 57' projecting from the bearing members, 46 and 46'. Two vertical arms, 58 and 58', upon the bell crank above and below the shaft receive the links, 59 and 59', extending forward to the point of control, so that at the will of the operator, the shaft 50 may be rocked in each direction. It will now be apparent that as the shaft, 50, is rocked from the mid position shown in Fig. 3, in clockwise direction it depresses levers, 56 and 57, and simultaneously raises levers, 57' and 56', thereby simultaneously and equally rocking the pendent bearing, 46 and 36 backward on their pivots and in like manner rocking the opposite bearings, 46' and 36', forward on their pivots, so throwing wheel 30 backward into engagement with the rear disk 29 and simultaneously moving wheel 30' forward into engagement with disk 29', each shaft being constantly in right-angle relation to the longitudinal axis of the vehicle.

In order that the driving relation between the shafts 30 and 30' and their respective traction wheels, 22 and 22' may not be disturbed, I mount that portion of the running gear connected with the traction wheels for fore and aft movements of each wheel coincident with the longitudinal movement of its connected friction gear shaft. As typifying a construction whereby the wheels may be shifted with respect to the frame, I mount the rear axle 22$^a$ upon side springs, 60 and 60', which at their rear ends are connected to swinging links 61, which in turn may conveniently be connected to a transverse platform spring, 62, and I arrange the front ends of the springs 60 and 60', each to provide a loop, 63, making sliding engagement with a pin, 64, carried by a bracket member, 65, secured to the side frame. Opposite end portions of the axle 22$^a$, I connect by link structures or reach members to the respective shaft bearings, a suitable construction being illustrated in Fig. 3, and comprising an adjustable reach rod, 67, having its sections connected by a turn buckle, 68, opposite ends of the reach rod being pivotally connected, as at 69 and 70, respectively to the pivoted bearing members, 46 and to the axle, 22$^a$. Thus it will be seen that as the driven shafts, 30 and 30', are moved fore and aft, the rear axle disposes itself to maintain constant the reach between either shaft and the proximate end of the axle, thereby to maintain substantially constant the positive drive relations between the shaft and the contiguous traction wheel, the actual movement of the shaft being so slight that the corresponding traction wheel movement does not in any way interfere with the operation of the vehicle. Of course, for some of the purposes of my invention, this feature may be omitted and the slackness of the chain, or lost motion in other gearing connections, depended upon for maintaining the driving relation between the longitudinally shiftable shaft of the transmitting gear and the tractors of the vehicle.

As customary in friction gears employing opposed friction wheels and corresponding opposed disks, the wheels are simultaneously movable longitudinally of their respective shafts, and it will be understood that the parts described with reference to the wheel 30 are duplicated with reference to the wheel 30'. The shaft 31 is provided with a feather, as at 73, and the hub of the wheel 30 is correspondingly grooved to slide longitudinally on the shaft, the wheel 30 being disked in the construction shown so that the length of the bearing members, 36, will not too much interfere with the range of movements of the wheel. As shown in Figs. 8 and 9, the hub, 30$^a$, of the wheel 30, is engaged by a yoke, 74, which receives on its opposite sides the vertical pivots of a fork, 75, the stem of which is made hollow, as at 76, to receive telescopically the end of a lever 77, which bends upward to form a vertical rock shaft, 78, passing through a sleeve, 79, on the bracket, 52, and receiving in its upper end an operating lever, 80, extending inward to connect with an operating link, 81. As the link 81 is moved forward and backward, the shaft portion, 78, is rocked, vibrating the part, 77, in a horizontal plane, and thereby shifting the wheel, 30, transversely of the frame and longitudinally of the shaft and a telescopically constructed joint, 76, 77, accommodating the change in relation of the pivot centers of the parts.

While I have herein described in some detail a particular embodiment of my invention, it will be apparent to those skilled in the art that many changes might be made in the specific construction without departure from the spirit of the invention and within the scope of the appended claims.

What I claim is:

1. In combination with a self-propelled vehicle having a frame and traction wheels carried thereby and movable longitudinally thereof, of a power transmission device comprising a primary driving shaft adapted to be rotated, confronting friction disks carried by said shaft, friction wheels between said disks, one on each side of the axis of rotation of the said disks, a shaft secondary driven for each of said wheels located at substantially right angles to the primary shaft, a pair of bearings for each said driven shaft, said bearings and shaft being bodily movable in directions transverse to the axis of said driven shafts, driving connections between said driven shafts and the respective traction wheels, and means for bodily moving said driven shafts and said traction wheels, whereby said shafts are at all times maintained in parallel relation with the faces of said friction disks when said friction wheels are moved into and out of contact with the faces of said disks.

2. In combination with a self-propelled vehicle having a frame, traction wheels carried thereby and slidingly movable longitudinally thereof, of a power transmission device comprising a primary driving shaft adapted to be rotated, two confronting friction disks carried thereby, friction wheels between said disks, one on each side of said primary shaft, a secondary driven shaft located at substantially right angles to said primary shaft, one for each of said wheels, bearings for each end of each driven shaft, a power transmitting connection between each of said driven shafts and the respective traction wheels, and means for bodily moving said bearings and said traction wheels, whereby said driven shafts are maintained at all times in parallel relation with said disks when said friction wheels are brought into and out of contact with the face of said disks.

3. In combination with a vehicle frame and traction wheels carried thereby and bodily movable fore and aft thereof, of a power transmission device comprising a main driving shaft, confronting friction disks mounted on said shaft, a pair of driven shafts in substantially the horizontal plane of the main shaft, friction wheels upon said driven shafts, power-transmission means connecting said driven shafts and traction wheels respectively, and means for simultaneously moving said driven shafts respectively and said traction wheels in opposite directions, comprising for each said shaft a pair of pivotally suspended bearings, and means for moving said pairs of bearings oppositely about their respective pivots.

4. In combination with a vehicle having a frame and traction wheels, carried thereby, and movable longitudinally of the frame, of a power transmission device comprising a rotatable main driving shaft, confronting friction disks upon said shaft, a sleeve rotatively loose upon said shaft, a bearing member pivoted to said sleeve, a driven shaft disposed at substantial right angles to said main shaft mounted in said pivoted bearing, a pivoted bearing member for the other end of said driven shaft, a power transmitting connection between said driven shaft and one of said traction wheels, connecting means between said shaft and said traction wheels to bodily move said wheels when said shaft is moved, and means for shifting the bearing members simultaneously and co-extensively to move said driven shaft bodily toward and from said disks.

5. In combination with a vehicle having a frame and a pair of traction wheels longitudinally movable of the frame, a pair of rotative, longitudinally-stationary friction-bearing confronting disks on the frame, a pair of longitudinally-shiftable wheels interposed between said disks, a rotative driving connection between each of said shiftable wheels, and its respective traction wheel, and means for simultaneously shifting said pair of friction wheels and respective traction wheels in opposite directions, thereby to move said friction wheels into and out of contact with the faces of the respective disks.

6. The combination of a vehicle frame, an axle mounted with respect thereto for longitudinally opposite shifting of its respective ends, traction wheels upon said axle ends, a motor, means connecting said motor to drive said traction wheels comprising a friction gearing, said friction gearing providing opposing friction disks, and oppositely longitudinally shifting friction wheels for coöperation with said disks, and reach connections between the oppositely shiftable elements of said friction gearing and the opposite ends of the axle, to shift the ends of the axle in harmony with the shifting of said gear elements.

7. The combination of a vehicle frame, rear springs therefor, longitudinally shiftable with respect to the frame, rear axle ends connected to said springs and movable therewith, traction wheels on said axle ends, an engine, and power connections between said engine and the traction wheels comprising a main shaft, confronting disks mounted on said shaft, opposing friction wheels interposed between said disks and bodily movable longitudinally in opposite directions for diagonally opposite engagement with said disks, shafts for said wheels, shiftable bearings for said shafts, positive driving connections between said shafts and the respective traction wheels, and positive connections for longitudinally moving said shafts and the axle ends bearing said traction wheels.

8. In combination with a self-propelled vehicle provided with traction wheels carried thereby and slidably movable thereon, a power transmission device for propelling said vehicle comprising parallel side frame members, a main shaft parallel with said members, separated confronting friction disks secured to said shaft, a loose sleeve upon said shaft located between said disks, a pair of bearings pivoted to said sleeve, one on each side thereof, bearings supported by the side frame members, a pair of alining transversely disposed shafts with relation to said main shaft, mounted in said bearings, one on each side of the main shaft, and in substantially the same horizontal plane thereof, a friction wheel upon each of said shafts, power transmitting means connecting said shafts and traction wheels, respectively, and means for simultaneously and co-extensively moving said respective traction wheel and both bearings of either shaft fore and aft to swing either friction wheel into contact with either friction disk.

In testimony whereof I hereunto set my hand in the presence of two witnesses.

GEORGE W. MARBLE.

In the presence of—
  GEORGE L. STEPHENSON,
  A. E. HALDERMAN.